US007545392B2

(12) United States Patent
Sprang et al.

(10) Patent No.: US 7,545,392 B2
(45) Date of Patent: Jun. 9, 2009

(54) DYNAMIC GUIDES

(75) Inventors: Steve Sprang, Monroeville, PA (US);
Steven P. Jobs, Palo Alto, CA (US);
Roger Rosner, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 10/449,862

(22) Filed: May 30, 2003

(65) Prior Publication Data

US 2004/0239691 A1    Dec. 2, 2004

(51) Int. Cl.
*G09G 5/00* (2006.01)
(52) U.S. Cl. .................. 345/677; 345/619; 345/629; 345/672; 345/676
(58) Field of Classification Search ........... 345/672, 345/676–677, 700, 731, 730, 732, 619, 629; 715/700, 730–732, 764
See application file for complete search history.

(56) References Cited

U.S. PATENT DOCUMENTS

| | | | | |
|---|---|---|---|---|
| 5,129,057 A | * | 7/1992 | Strope et al. | 345/629 |
| 5,894,310 A | * | 4/1999 | Arsenault et al. | 345/679 |
| 6,308,144 B1 | * | 10/2001 | Bronfeld et al. | 345/672 |
| 2002/0140708 A1 | * | 10/2002 | Sauer | 345/633 |
| 2006/0259872 A1 | * | 11/2006 | Mullen et al. | 715/764 |

OTHER PUBLICATIONS

Microsoft Office Visio, "Animate Visio shapes in Powerpoint", Microsoft Corporation, 2007, pp. 1-7.*
"Adobe PageMaker 6.5—Working with Rulers & Graphs", [online]. [retrieved on Aug. 29, 2002]. Retrieved from the Internet: <URL: http://www.uwec.edu/Help/PageMaker/ruleguid.htm>, (2002), 4 pgs.
"Inside Mac OS X—Converter: Creating a User Interface with Interface Builder", © 2002 Apple Computer, Inc.,(Jun. 2002), 24 pgs.
"Interface Builder", [online]. (c) 2002 Apple Computer, Inc. [retrieved on Aug. 29, 2002]. Retrieved from the Internet: <URL: http://developer.apple.com/tools/interfacebuilder/>,(2002), 2 pgs.
"Keynote User's Guide", (c) 2003 Apple Computer, Inc.,(2003),100 pgs.

* cited by examiner

*Primary Examiner*—Chante Harrison
(74) *Attorney, Agent, or Firm*—Schwegman, Lundberg & Woessner, P.A.

(57) ABSTRACT

A system, method, and apparatus that, in some embodiments, displays one or more guides when a selected object moves into a particular alignment with one or more other objects is described. The one or more guides may be used to align the objects in relation to one another. In this way, the screen is free from the clutter of guides when they are not needed, but the guides are present when they are needed, i.e., when the selected object moves into or near alignment with another object or objects.

4 Claims, 8 Drawing Sheets

DYNAMIC GUIDES

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to document processing and particularly to the creation and editing of objects in documents, presentation software, graphical user interface (GUI) development tools, drafting and drawing applications, and various other single-media and multimedia creation and editing tools using a dynamic guide.

BACKGROUND

In the past, people communicated information in a presentation by writing on a blackboard or by projecting foils or transparencies onto a wall screen. But, today computer users employ presentation graphics software to generate sophisticated and professional-looking documents that may be, e.g., projected onto a wall screen, printed as books or brochures, or published as web pages. Examples of presentation graphics software are Microsoft PowerPoint, Adobe FrameMaker, and Adobe PageMaker.

Such software packages often have a grid or guide feature that displays a line or lines on a computer screen to aid the user when aligning objects in the document, where an object is any element that can be manipulated within the document. Although these grid or guide lines are displayed on the computer screen during the editing process, they are typically not included when the document is presented or printed. When the user moves or drags an object close (within a specified range) to the grid or guide line, the software takes over movement of the object and automatically snaps the object to the grid or guide line. This snapping function frees the user from manually aligning objects exactly and prevents objects from being slightly misaligned.

In another example, the AutoCAD software package available from Autodesk, Inc. of San Rafael, Calif., includes a "Drafting Settings" menu with an "Object Snap" portion. The object snap portion includes several object snap modes including, for example, endpoints, midpoints, and centers. The Object Snap menu allows the Object Snap function to be on or off. The Object Snap menu also allows Object Snap Tracking to be on or off.

Although guide and grid aligns have the above advantages, they also have the disadvantage that they visually clutter the screen and distract the user from seeing the objects that the user desires to manipulate and edit. Thus, a feature is needed that has the advantages of guide or grid lines while decreasing their disadvantages.

SUMMARY

A system, method, apparatus that in some embodiments display one or more guides when a selected object moves into a particular alignment with one or more other objects. The one or more guides may be used to align the objects in relation to one another. In this way, the screen is free from the clutter of guides when they are not needed, but the guides are present when they are needed, i.e., when the selected object moves into or near alignment with another object or objects.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures, and techniques have not been shown in detail in order not to obscure the invention.

As used herein, "alignment" refers to any measurable relationship between the position of two or more objects. Alignment is not limited to linear alignment.

Figure 1A:
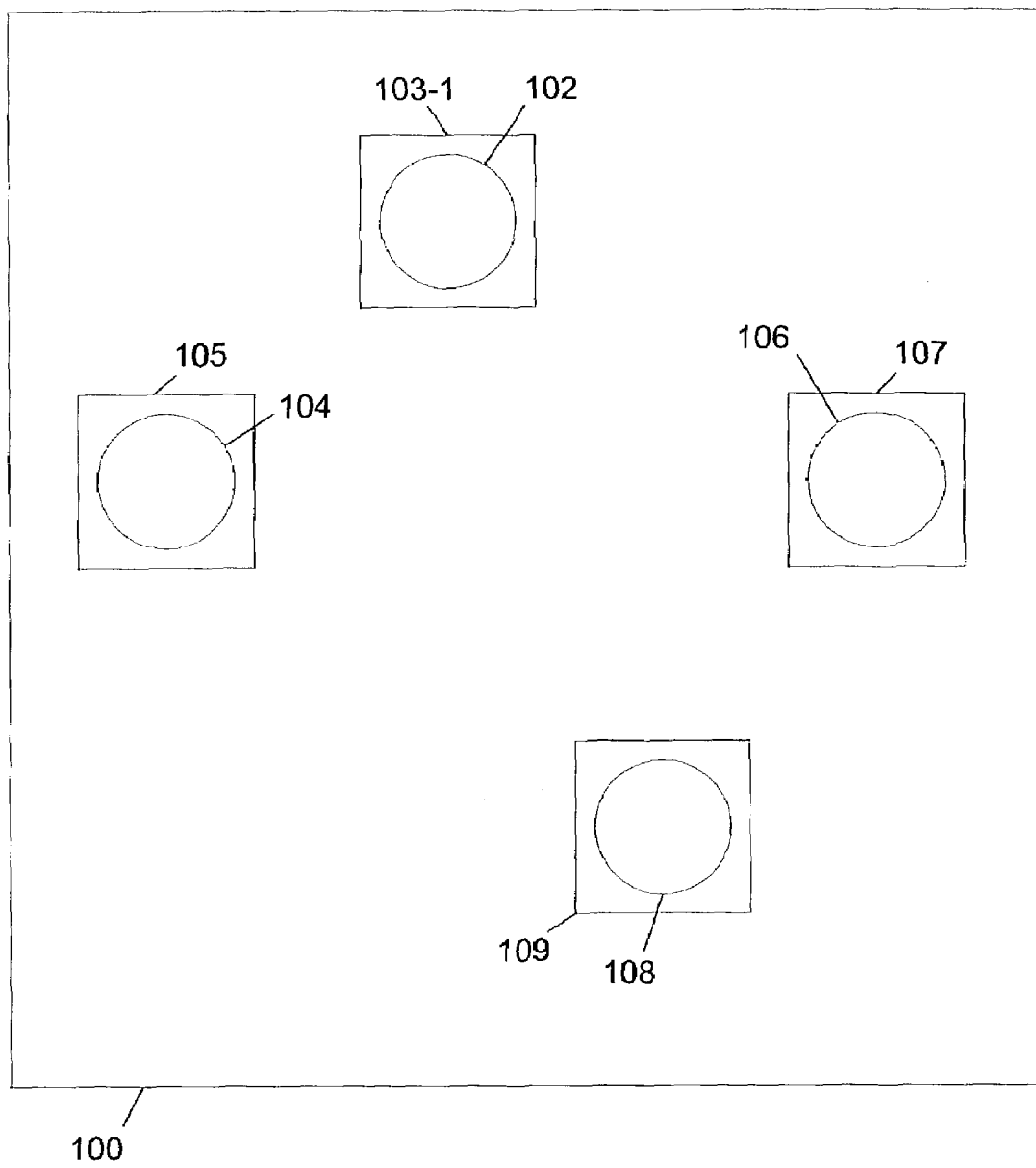
FIG. 1A depicts a block diagram of an example user interface according to an embodiment of the invention.

An "alignment property" is any property of an object that may be used for aligning objects. Embodiments of the invention are not limited to any particular alignment property. Examples of alignment properties include, but are not limited to, geometric properties and user defined properties. Example geometric properties include an edge, a center (either horizontal or vertical), a top, a bottom, a right side, a left side, and so on. Example user-defined properties include any point, line, angle, surface, and the like of an object as identified by the user. In one embodiment, an object is an irregular shaped object and the user defined alignment property is any FIG. 1A depicts a block diagram of an example user interface according to an embodiment of the invention. Window 100 includes objects 102, 104, 106, and 108. No guide lines are shown in FIG. 1A because none of the objects are within a snap threshold of any guide lines. However, objects 102, 104, 106, 108 need not be orthogonally aligned for display guide lines to be displayed. In one embodiment, objects have geometric shapes such as a rectangle, triangle, circle, oval, square, and so on. In an alternate embodiment, one or more of the objects have irregular shapes such as the shape of an arrow, a chart, a table, a picture or thumbnail and the like.

Also shown are bounds 103-1, 105, 106, and 109, which may be rectangular, square, circular, hexagonal, polygonal or any other geometric shaped that defines a boundary of an object that surround the objects 102, 104, 106, and 108, respectively. In another embodiment, the bounds 103-1, 105, 106, and 109 are not displayed, but are instead only virtual boxes that are used in calculating the guide lines as further described below. In still another embodiment, the bounds of the object are displayed but only when the guide lines are displayed. In another embodiment, the bounds are continuously displayed. In one embodiment of presentation software, the bounds are continuously displayed while a presentation is edited, but not displayed while a presentation is being given or a slide show shown. In some other embodiments, the bounds are displayed for predetermined period of time following a positional adjustment to an object. In one such embodiment, the period of time the bounds are displayed is a user configuration setting.

Although four objects are shown, in other embodiments, any number of objects may be present. Although the objects 102, 104, 106, and 108 are shown as circular in shape, in another embodiment the each object may have any geometric shape. Indeed, each object may have a distinct shape selected from any geometric or any irregular shape. Although objects 102, 104, 106, and 108 are shown as equal in size, in other embodiments some or all of the objects may have a different size.

Figure 1B:
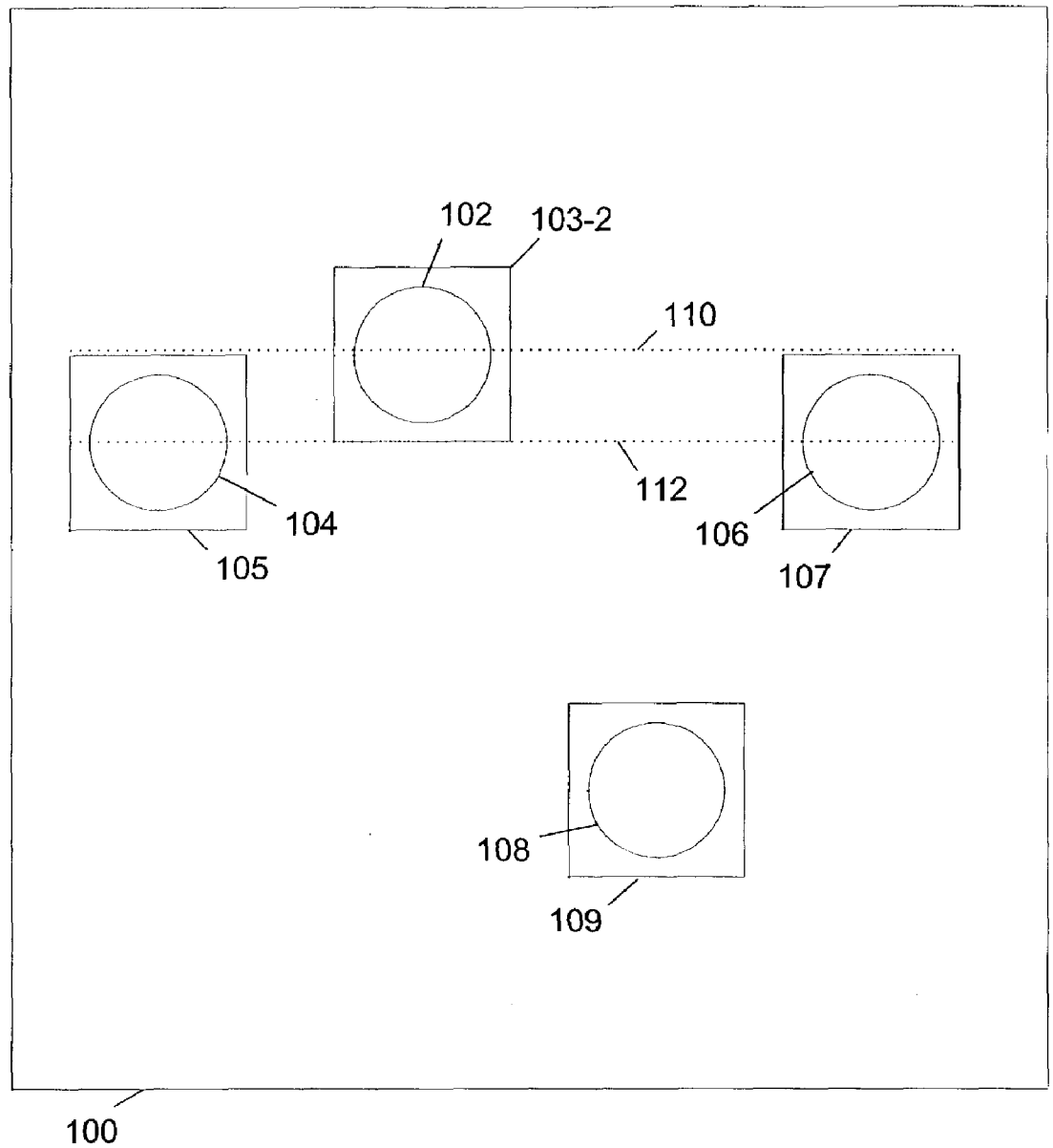
FIG. 1B depicts a block diagram of an example user interface illustrating two horizontal dynamic guide lines according to an embodiment of the invention.

FIG. 1B depicts a block diagram of an example user interface illustrating horizontal top-and-middle dynamic-guides according to an embodiment of the invention. A user has selected the object 102 and moved the object 102 downward within the snap threshold of horizontal guides 110 and 112 associated with the top and the horizontal-middle, respectively, of the objects 104 and 106, so horizontal guide lines 110 and 112 are visibly displayed. The objects 104, 106, and 108 remained stationary while the object 102 moved. The user may move the object 102 via a drag-and-drop operation using a mouse or other pointing device, but in other embodiments any appropriate mechanism may be used to move the object 102. When the object 102 being moved comes into alignment with another object 104, 106, or 108 guides appear. For example, when the object being moved 102 comes into alignment with object 104, guides 110 and 112 are displayed. Similarly, guides 110 and 112 are also displayed when the object 102 comes into alignment with another object such as object 106. The display of guides indicates that a particular alignment has occurred between two or more objects. The horizontal guides 110 and 112 represent the combined guide lines for the top and horizontal-middle, respectively, of the objects 104 and 106 since the guide lines for objects 104 and 106 overlap. The horizontal guide line 110 extends from the top portion of the bounds 105 for the object 104 to the middle portion of the bounds 103-2 for the object 102 to the top portion of the bounds 107 for the object 106. The horizontal guide line 112 extends from the middle portion of the bounds 105 for the object 104 to the bottom portion of the bounds 103-2 for the object 102 to the middle portion of the bounds 107 for the object 106. Although the guides 110 and 112 are drawn as dashed black lines, in other embodiments any appropriate pattern, color, shape may be used. FIG. 1B depicts horizontal guides 110 and 112 as straight lines, thereby indicating linear alignment between objects 104 and 106. As will be apparent to persons skilled in the art, because each of horizontal guides 110 and 112 represents the combined guide lines for each of the top and horizontal-middle of both of objects 104 and 106, and since those guide lines overlap to combine into lines 110 and 112, the guide lines for objects 104 and 106 are also linear.

In some embodiments, the properties of the guides are user configurable. In one such embodiment the user configuration settings include line pattern, shape, color, and width. In some other embodiments, a user can optionally configure the system to display guides when an object is at a certain angle in relation other objects. In one such embodiment, the user configuration setting causes guides to be displayed at fifteen degree intervals when an object being moved is at an angle in relation to another object that is devisable by fifteen. In some such embodiments, the angle of the objects in relation to one another is displayed along with a guide to apprise the user of the angle the objects are in relation to one another. In yet another embodiment, when two or more objects become aligned, the user may optionally configure the system to prevent the lines from appearing. In one such embodiment, the user may configure the system to alternatively cause the aligned objects to turn a different color. The different color indicates alignment rather than the guides.

Figure 1C:
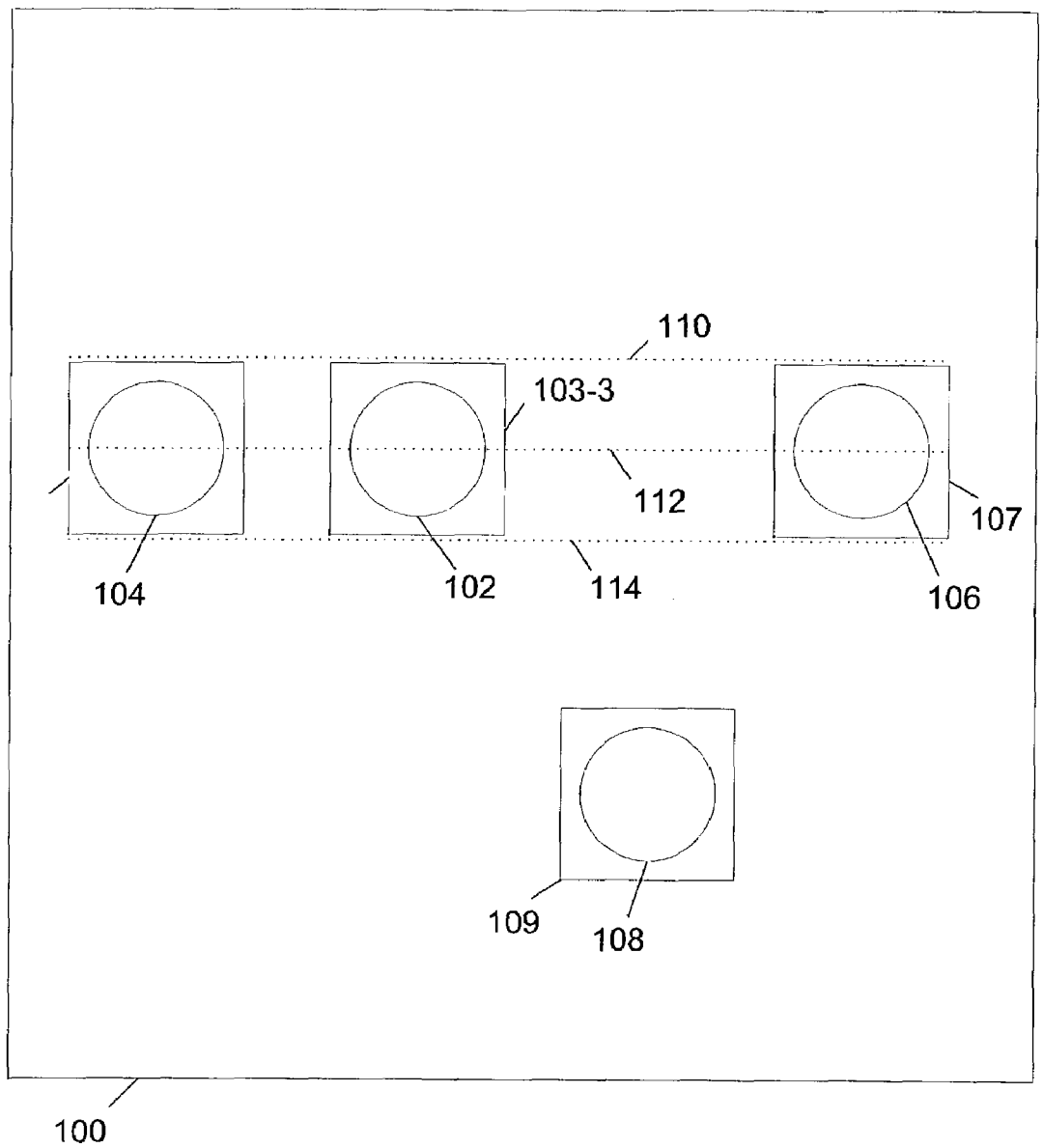
FIG. 1C depicts a block diagram of an example user interface illustrating three horizontal dynamic guide lines according to an embodiment of the invention.

FIG. 1C depicts a block diagram of an example user interface illustrating horizontal top-middle-bottom dynamic-guide lines according to an embodiment of the invention. The user has moved the object 102 further downward (from FIG. 1B) within the snap threshold of the horizontal guide lines 110, 112, and 114 associated with the top, horizontal-middle, and bottom, respectively, of the objects 104 and 106, so the horizontal guide lines 110, 112, and 114 are visibly displayed. The horizontal guide lines 110, 112, and 114 represent the combined guide lines for the top, horizontal-middle, and bottom, respectively, of objects 104 and 106 since the guide lines for objects 104 and 106 overlap. The horizontal guide line 110 extends from the top portion of the bounds 105 for the object 104 to the top portion of the bounds 103-3 for the object 102 to the top portion of the bounds 107 for the object 106. The horizontal guide line 112 extends from the middle portion of the bounds 105 for the object 104 to the middle portion of the bounds 103-3 for the object 102 to the middle portion of the bounds 107 for the object 106. The horizontal guide line 114 extends from the bottom portion of the bounds 105 for the object 104 to the bottom portion of the bounds 103-3 for the object 102 to the bottom portion of the bounds 107 for the object 106. In some embodiments, the guide lines do not contact the objects, or the bounds thereof, being aligned. In some other embodiments, the guide lines do contact the objects being aligned and/or the bounds thereof. In one such embodiment, a guide line completely covers a portion of the object or its bounds being aligned. In another embodiment, a guide is a solid line except where it over laps with the object or bounds being aligned. Instead, the guide line is displayed as a dotted line or alternatively the guide line is displayed in a color different from both the guide line and the object overlapped by the line.

Figure 1D:
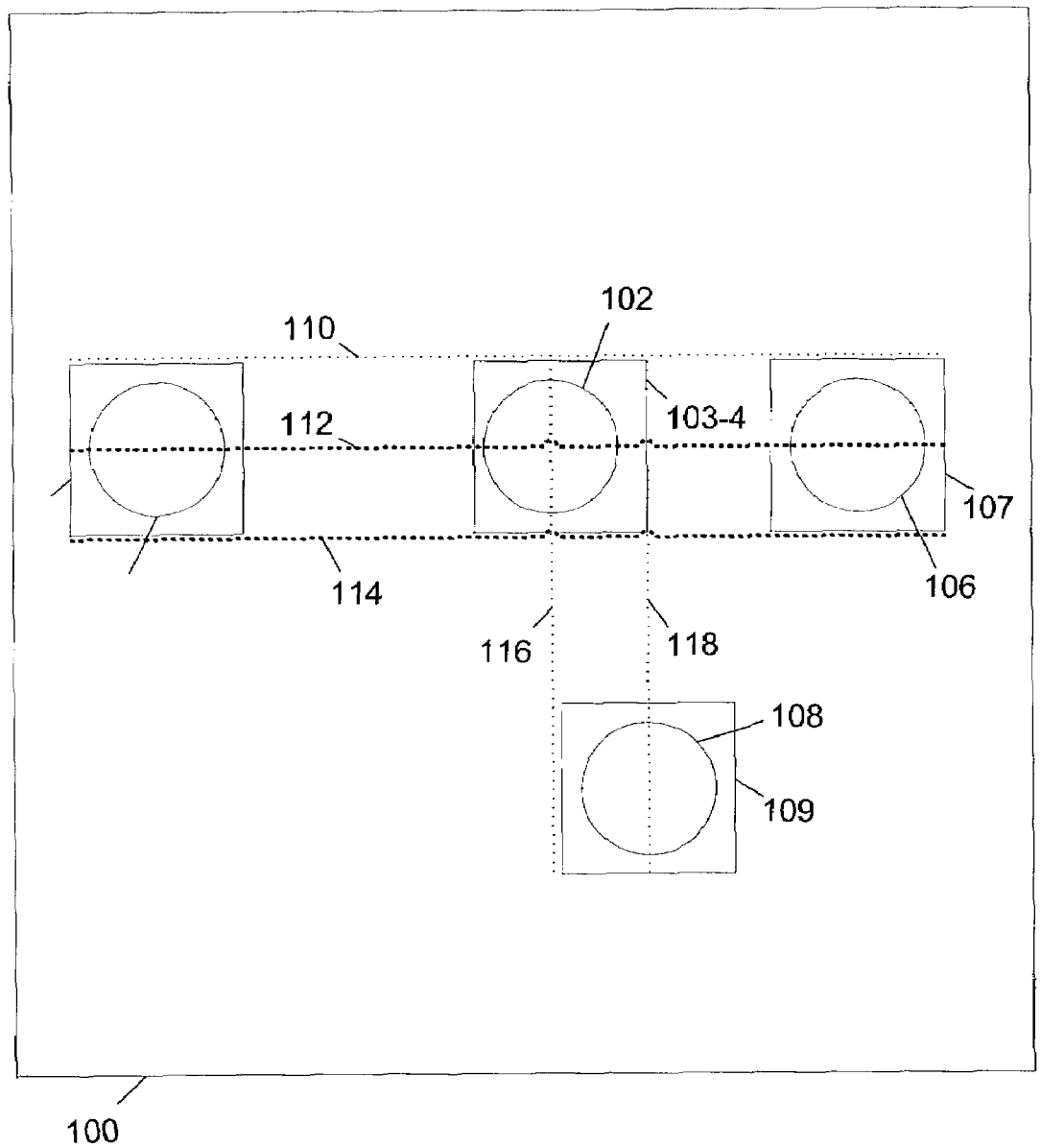
FIG. 1D depicts a block diagram of an example user interface illustrating horizontal and vertical dynamic guide lines according to an embodiment of the invention.

FIG. 1D depicts a block diagram of an example user interface illustrating horizontal and vertical dynamic-guide lines according to an embodiment of the invention. The user has moved the object 102 to the right (from FIG. 1C) within the snap threshold of the vertical guide lines 116 and 118 associated with the left and center, respectively, of the object 108 and associated with the center and right, respectively, of the object 102. Thus, vertical guide lines 116 and 118 are visibly displayed and horizontal guide lines 110, 112, and 114 continue to be visibly displayed. The horizontal guide lines 110, 112, and 114 continue to represent the combined guide lines for the top, horizontal-middle, and bottom, respectively, of objects 104 and 106 since the guide lines for objects 104 and 106 overlap. The vertical guide line 116 represents the combined guide lines for the vertical center of the object 102 and the left of the object 108. The vertical guide line 118 represents the combined guide lines for the right of the object 102 and the vertical center of the object 108.

The horizontal guide line 110 extends from the top portion of the bounds 105 for the object 104 to the top portion of the bounds 103-4 for the object 102 to the top portion of the bounds 107 for the object 106. The horizontal guide line 112 extends from the middle portion of the bounds 105 for the object 104 to the middle portion of the bounds 103-4 for the object 102 to the middle portion of the bounds 107 for the object 106. The horizontal guide line 114 extends from the bottom portion of the bounds 105 for the object 104 to the bottom portion of the bounds 103-4 for the object 102 to the bottom portion of the bounds 107 for the object 106. The vertical guide line 116 extends from the center portion of the bounds 103-4 for the object 102 to the left portion of the bounds 109 for the object 108. The vertical guide line 118 extends from the right portion of the bounds 103-4 for the object 102 to the center portion of the bounds 109 for the object 108.

Figure 1E:
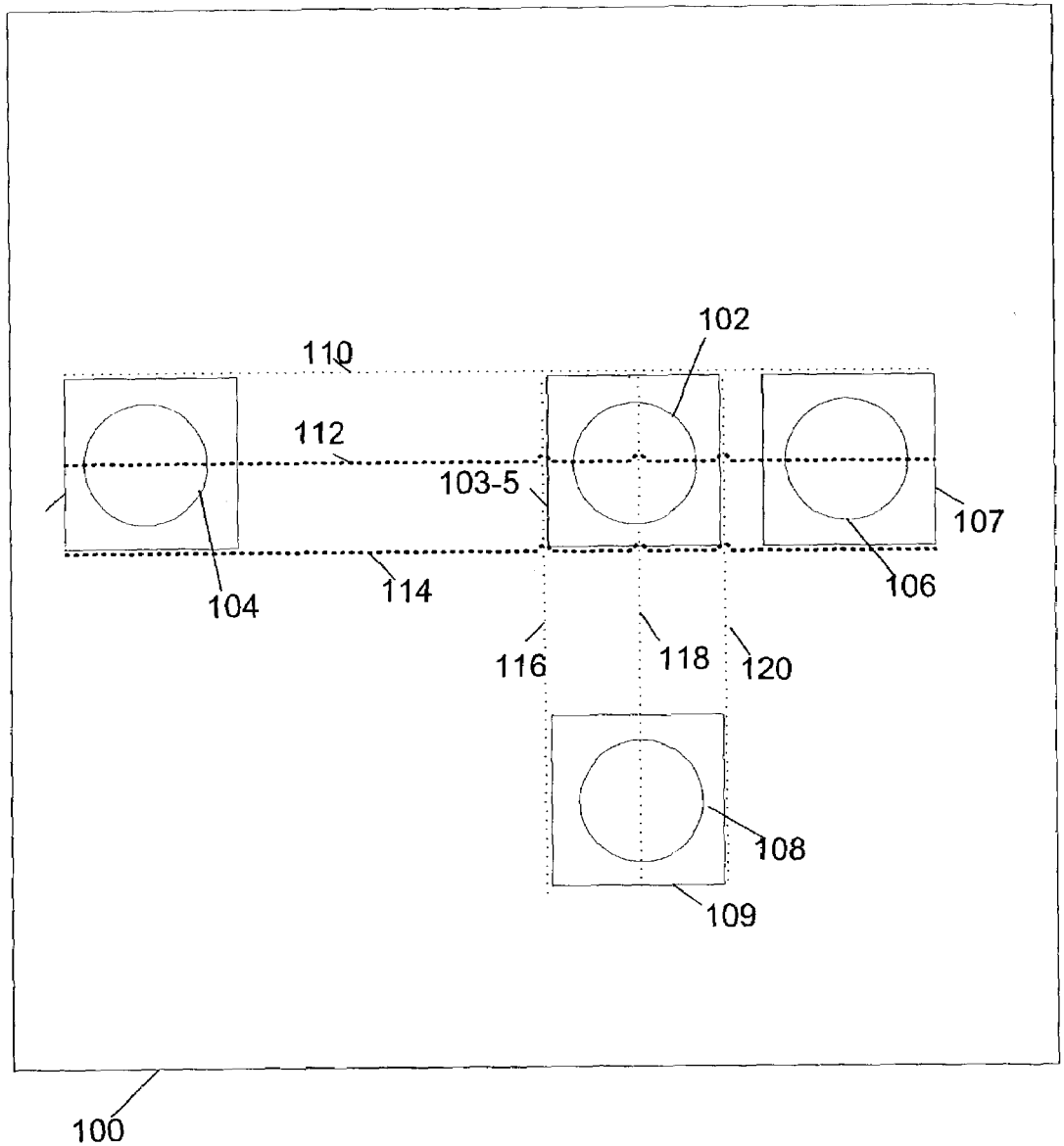
FIG. 1E depicts a block diagram of an example user interface illustrating horizontal and vertical dynamic guide lines according to an embodiment of the invention.

FIG. 1E depicts a block diagram of an example user interface illustrating horizontal and vertical dynamic guide lines according to an embodiment of the invention. The user has moved the object 102 further to the right (from FIG. 1D) within the snap threshold of the vertical guide lines 116, 118, and 120 associated with the left, vertical-center, and right, respectively, of the object 108 and associated with the left, center, and right respectively, of the object 102. Thus, vertical guide lines 116, 118, and 120 are visibly displayed and horizontal guide lines 110, 112, and 114 continue to be visibly displayed. In some embodiments the guide lines are displayed only while an object 102 is being moved. In one such embodiment, the guide lines are displayed until a user either moves the object being moved 102 away from the object the object being moved is in alignment with or the object is placed and is no longer being moved. The horizontal guide lines 110, 112, and 114 continue to represent the combined guide lines for the top, horizontal-middle, and bottom, respectively, of objects 104 and 106 since the guide lines for objects 104 and 106 overlap. The vertical guide line 116 represents the combined guide lines for the left of the object 102 and the left of the object 108. The vertical guide line 118 represents the combined guide lines for the vertical-center of the object 102 and the vertical-center of the object 108. The vertical guide line 120 represents the combined guide lines for the right of the object 102 and the right of the object 108.

One embodiment of the present invention is incorporated in a product named Keynote available from Apple Computers, Inc. of Cupertino, Calif. The "Keynote User's Guide" © 2003 Apple Computer Inc., describes operation of alignment guides according to an example embodiment of the invention and is herein incorporated by reference.

The horizontal guide line 110 extends from the top portion of the bounds 105 for the object 104 to the top portion of the bounds 103-5 for the object 102 to the top portion of the bounds 107 for the object 106. The horizontal guide line 112 extends from the middle portion of the bounds 105 for the object 104 to the middle portion of the bounds 103-5 for the object 102 to the middle portion of the bounds 107 for the object 106. The horizontal guide line 114 extends from the bottom portion of the bounds 105 for the object 104 to the bottom portion of the bounds 103-5 for the object 102 to the bottom portion of the bounds 107 for the object 106. The vertical guide line 116 extends from the left portion of the bounds 103-5 for the object 102 to the left portion of the bounds 109 for the object 108. The vertical guide line 118 extends from the center portion of the bounds 103-5 for the object 102 to the center portion of the bounds 109 for the object 108. The vertical guide line 120 extends from the right portion of the bounds 103-5 for the object 102 to the right portion of the bounds 109 for the object 108.

In an embodiment, an object (e.g. object 102) has 6 guides, a horizontal-top guide (e.g. 110), a horizontal-middle guide (e.g. 112), a horizontal-bottom guide (e.g. 114), a vertical-left guide (e.g. 116), a vertical-center guide (e.g. 118), and a vertical-right guide (e.g. 120). In another embodiment, the horizontal-middle and vertical-center guides are not used. In still another embodiment, any number of guides may be used. In one embodiment, the appropriate guides are only displayed when the object is within a snap threshold of another object, as can be seen in FIGS. 1A, 1B, 1C, 1D, and 1E, and as further described below with reference to FIG. 3.

Figure 2:
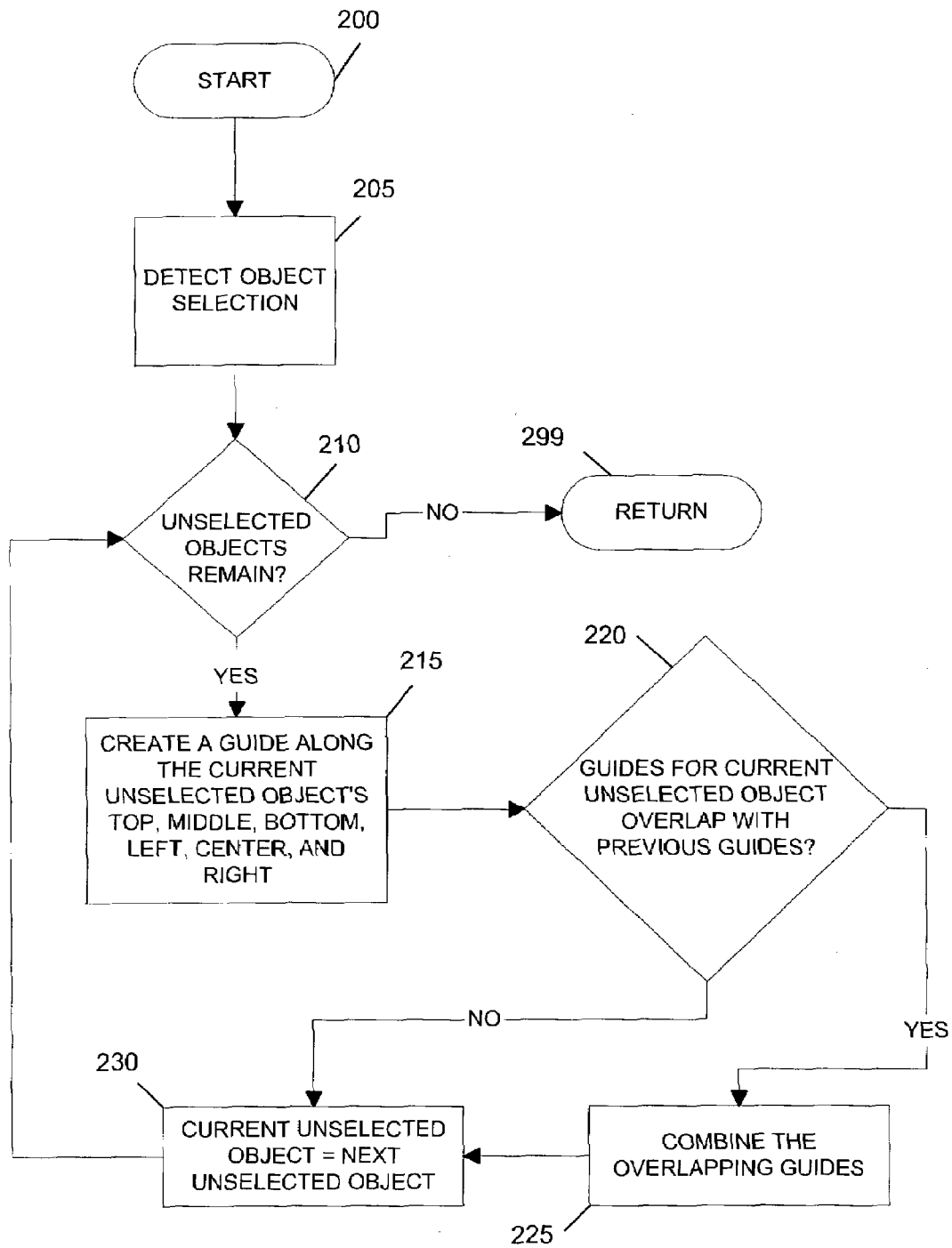
FIG. 2 depicts a flowchart of example processing upon selection of an object according to an embodiment of the invention.

FIG. 2 depicts a flowchart of example processing upon selection of an object according to an embodiment of the invention. Control begins at block 200. Control then continues to block 205 where selection of an object (for example object 102 of FIG. 1) is detected. A user may select an object, for example, by clicking on it using a mouse or other pointing device, but any appropriate mechanism may be used to select an object. Such as touch on a touch screen or an electronic stylus on a pen computing device. Accordingly, this description of the invention is not intended to limit the present invention to any particular method or means of selecting an object. Alternative methods will be readily apparent to one of skill in the art.

Control then continues to block 210 where a determination is made whether any unselected objects remain to be processed (in the example of FIG. 1A, objects 104, 106, and 108 are unselected). If the determination at block 210 is true, then control continues to block 215 where guide lines are created (but not displayed) along the current unselected object's top, horizontal-middle, bottom, left, vertical-center, and right using the bounds of the object. Control then continues to block 220 where a determination is made whether any of the guides for the current unselected object overlap with any previously processed guide (the guides for objects 104 and 106 overlap in the example of FIG. 1B). If the determination at block 220 is false, then control continues to block 230 where the current unselected object is set to be the next unselected object. Control then returns to block 210 as previously described above.

In another embodiment, guide lines are created before the object is selected. For example, the guide lines exist for all objects that are aligned prior to detecting 205 an object selection. However, the lines are invisible to a system user. In one such embodiment, when an object selection is detected 205, the method rather than creating 215 guide lines causes the guide lines to be come visible.

If the determination at block 220 is true, then control continues to block 225 where the overlapping guides are combined. (In the example of FIG. 1B, guide 110 is combined from the overlapping guides of the top of objects 104 and 106, and guide 112 is combined from the overlapping guides of the horizontal-middle of objects 104 and 106.) In some embodiments, the combining 220 of guides includes changing the overlapping portions of the lines to a color different than the color or either line. In another embodiment, the overlapping portions become invisible. In yet another embodiment, when guide lines of differing colors overlap, the lines at overlapping portions becomes dotted or dashed lines where the dots or dashed alternate in color between the colors of the overlapping lines. Control then continues to block 230 as previously described above.

If the determination at block 210 is false, then control continues to block 299 where the function returns.

Figure 3:
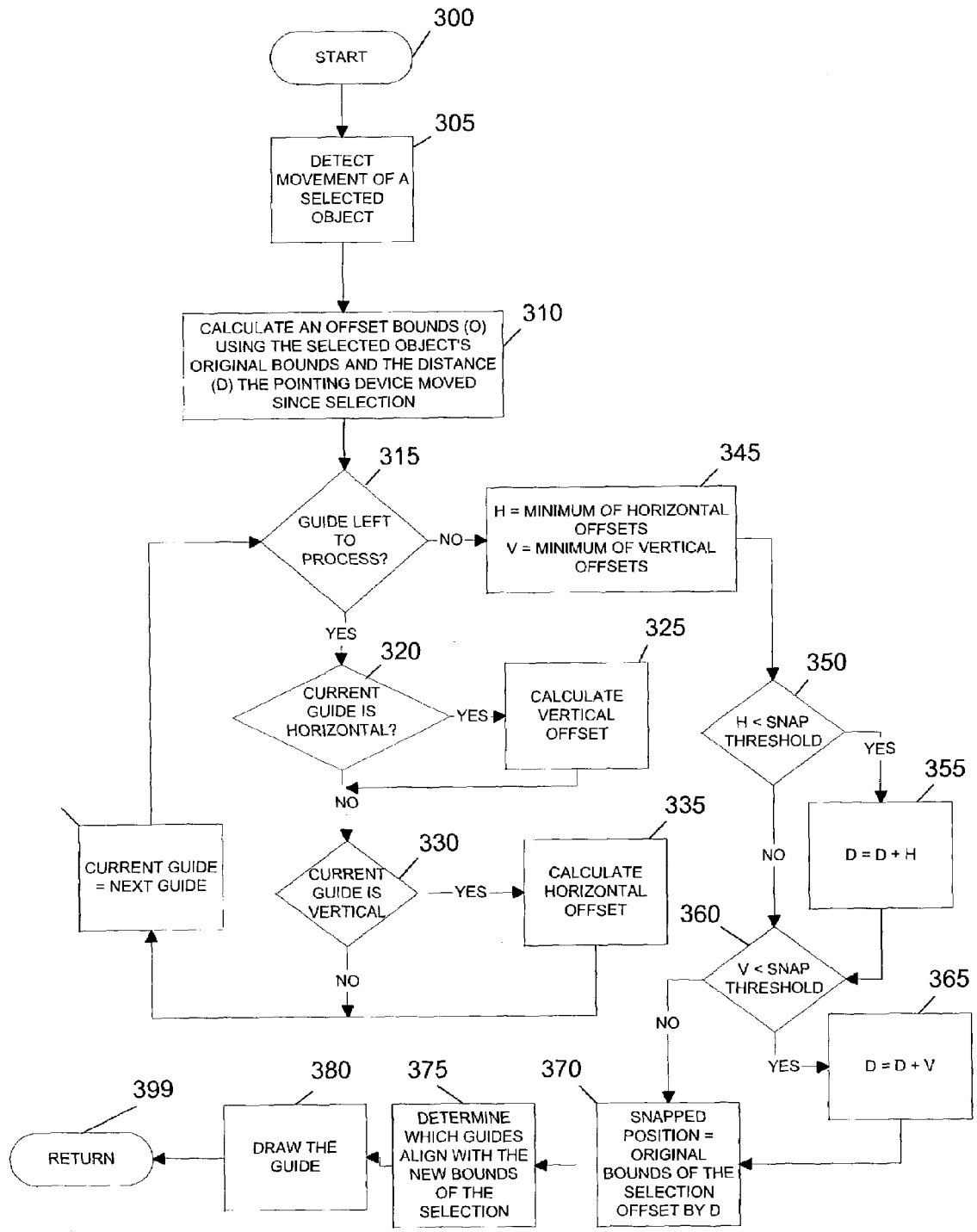
FIG. 3 depicts a flowchart of example processing upon movement of an object according to an embodiment of the invention.

FIG. 3 depicts a flowchart of example processing upon movement of an object according to an embodiment of the invention. Control begins at block 300. Control then continues to block 305 where movement of a selected object is detected. An object may be moved via a dragging operation, but in other embodiments any appropriate moving mechanism may be used.

Control then continues to block 310 where an offset bounds (referred to below as "O") for the selected object is calculated using the selected object's original bounds and the distance (referred to below as "D") the object has moved since it was selected. In the example of FIG. 1A, bounds 103-1 is the original bounds for the selected object 102. In the examples of FIGS. 1B, 1C, 1D, and 1E, bounds 103-2, 103-3, 103-4, and 103-5 are the respective offset bounds for the selected object 102.

Control then continues to block 315, which is the beginning of a loop that, in some embodiments, processes all guides. (The guides were previously created as described above with reference to FIG. 2.) At block 315 a determination is made whether any guides are left to process. If the determination at block 315 is true, then control continues to block 320 where a determination is made whether the current guide is a horizontal guide. If the determination at block 320 is true, then control continues to block 325 where a vertical offset is determined by calculating the minimum of the distance between the guide and the top of the offset bounds, the distance between the guide and the middle of the offset bounds, and the distance from the guide to the bottom of the offset bounds. This calculation can be expressed as: minimum {distance[guide, top(O)], distance[guide, middle(O)], distance[guide, bottom(O)]}.

Control then continues to block 330 where a determination is made whether the current guide is a vertical guide. If the determination at block 330 is true, then control continues to block 335 where a horizontal offset is determined by calculating the minimum of the distance between the guide and the left of the offset bounds, the distance between the guide and the center of the offset bounds, and the distance from the guide to the right of the offset bounds. This calculation can be expressed as: minimum {distance[guide, left(O)], distance[guide, center(O)], distance[guide, right(O)]}.

Control then continues to block 340 where the current guide is set to be the next guide to process. Control then returns to block 315 as previously describe above.

If the determination at block 330 is false, then control continues directly to block 340 as previously described above.

If the determination at block 320 is false, then control continues directly to block 330 as previously described above.

If the determination at block 315 is false, then all of the guides have been processed, so control continues to block 345 where H is set to be the minimum of all the horizontal offsets previously calculated for the vertical guides at block 335 and V is set to be the minimum of all the vertical offsets previously calculated for the horizontal guides at block 325.

Control then continues from block 345 to block 350 where a determination is made whether H (the minimum of the horizontal offsets) is less than a snap threshold, which is the distance from the bounds at which the selected object snaps to the guide. If the determination at block 350 is true, then control continues to block 355 where D is set to be D plus H. Control then continues to block 360 where a determination is made whether V is less than the snap threshold. If the determination at block 360 is true, then control continues to block 365 where D is set to be D plus V.

Control then continues to block 370 where the snapped position is set to be the original bounds of the selected object offset by D. The snapped position is used to snap the selected object to the snapped position when the user stops moving the selected object.

Control then continues to block 375 where the guides that align with the new bounds of the selection are found. (For example, guides 110 and 112 in FIG. 1B align with the new bounds 103-2 of the object 102.) Control then continues to block 380 where the guides previously determined at block 375 are drawn on the screen. Control then continues to block 399 where the function returns.

If the determination at block 360 is false, then control continues directly to block 370 as previously described above.

If the determination at block 350 is false, then control continues directly to block 360 as previously described above.

A document, display, interface, etc. that is created and/or manipulated with an embodiment of the present invention may contain multiple layers. In one such embodiment, a user manipulates a single layer at a time. In such an embodiment, the method depicted in FIG. 3 and described above is performed only for the layer presently being manipulated. For example, a user is working with a document with a background and a foreground. The user manipulates the foreground by selecting a moving an object. The object movement is detected 305 on the foreground. Thus, the method is only performed on the foreground. In another embodiment, the manipulation tool may only allow the manipulating of objects on a single layer at a time. In such an embodiment, the method is only performed for the current layer under manipulation. In yet another embodiment, the manipulation tool allows the manipulation of objects on more the one layer at a time. In such an embodiment, the method is performed on all levels concurrently and facilitates the alignment of objects from one layer with the objects of another layer or layers.

Figure 4:
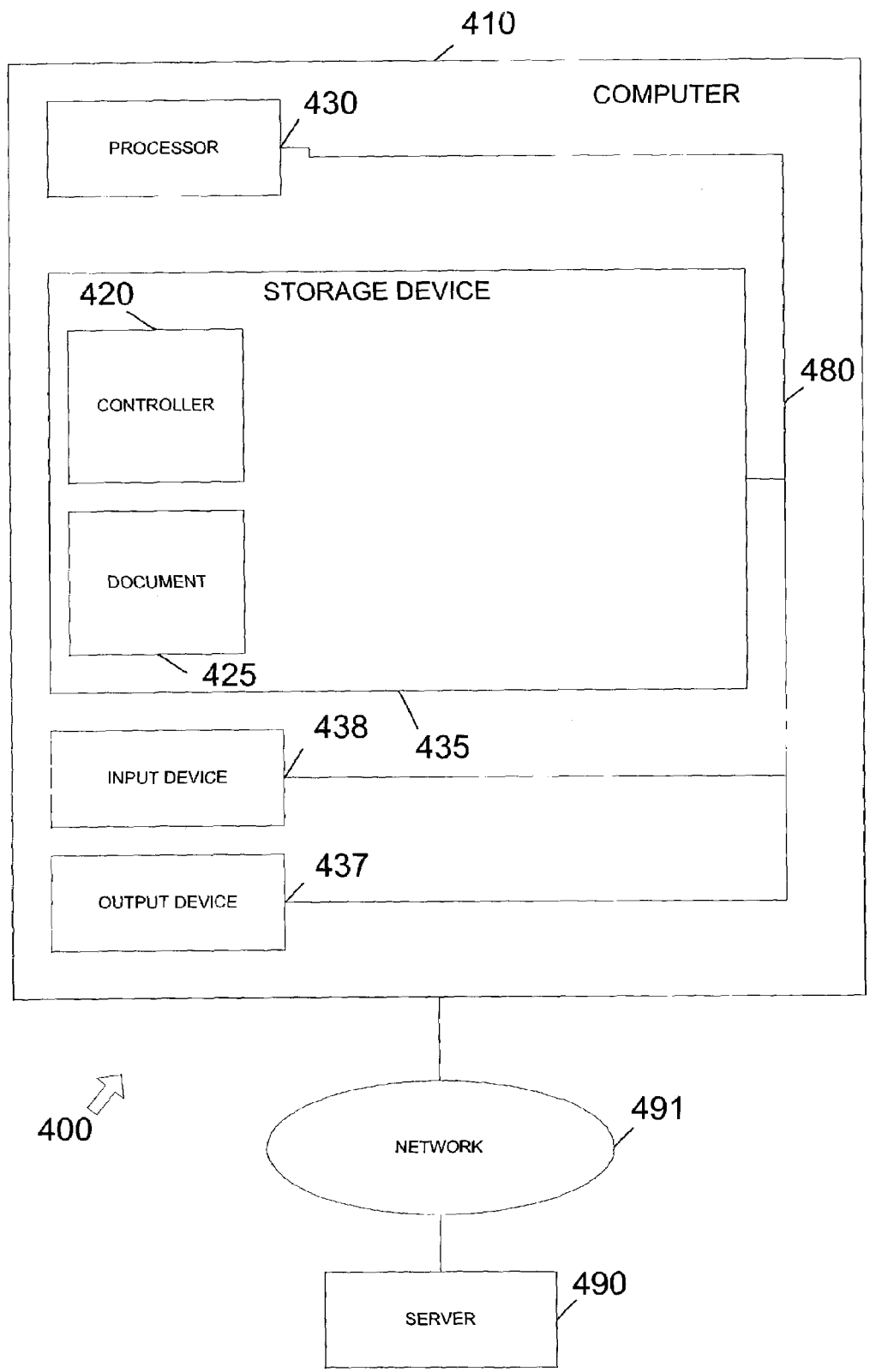
FIG. 4 depicts a block diagram of an example system for implementing an embodiment of the invention.

FIG. 4 depicts a block diagram of an example system for implementing an embodiment of the invention. A system 400 includes a computer 410 connected to a server 490 via a network 491. Although one computer 410, one server 490, and one network 491 are shown, in other embodiments any number or combination of them are present. In another embodiment, the server 490 and the network 491 are not present.

The computer 410 includes a processor 430, a storage device 435, an output device 437, and an input device 438, all connected via a bus 480.

The processor 430 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 430 executes instructions and includes that portion of the computer 410 that controls the operation of the entire computer. Although not depicted in FIG. 4, the processor 430 typically includes a control unit that organizes data and program storage in memory and transfers data and other information between the various parts of the computer 410. The processor 430 receives input data from the input device 438 and the network 491, reads and stores code and data in the storage device 435, and presents data to the output device 437.

Although the computer 410 is shown to contain only a single processor 430 and a single bus 480, the present invention applies equally to computers that may have multiple processors and to computers that may have multiple buses with some or all performing different functions in different ways.

The storage device 435 represents one or more mechanisms for storing data. For example, the storage device 435 may include read only memory (ROM), random access memory (RAM), magnetic disk storage media, optical storage media, flash memory devices, and/or other machine-readable media. In other embodiments, any appropriate type of storage device may be used. Although only one storage device 435 is shown, multiple storage devices and multiple types of storage devices may be present. Further, although the computer 410 is drawn to contain the storage device 435, it may be distributed across other computers, for example on server 490.

The storage device 435 includes a controller 420 and a document 425. The controller 420 includes instructions capable of being executed on the processor 430 to carry out the functions of the present invention, as previously described above with reference to FIGS. 1A, 1B, 1C, 1D, 1E, 2, and 3. In another embodiment, some or all of the functions of the present invention are carried out via hardware in lieu of a processor-based system. In an embodiment, the controller 420 is a presentation application, but in other embodiments, the controller 420 may include any function capable of manipulating objects. Of course, the storage device 435 may also contain additional software and data (not shown), which is not necessary to understanding the invention. The document 425 contains an object or objects capable of being manipulated while displayed on the output device 437. An example of objects manipulated within the document 425 was previously described above with reference to FIGS. 1A, 1B, 1C, 1D, and 1E.

Referring again to FIG. 4, although the controller 420 and the document 425 are shown to be within the storage device 435 in the computer 410, some or all of them may be distributed across other systems, for example on the server 490 and accessed via the network 491.

The output device 437 is that part of the computer 410 that displays output to the user. The output device 437 may be a cathode-ray tube (CRT) based video display well known in the art of computer hardware. But, in other embodiments the output device 437 may be replaced with a liquid crystal display (LCD) based or gas, plasma-based, flat-panel display. In still other embodiments, any appropriate display device may be used. Although only one output device 437 is shown, in other embodiments, any number of output devices of different types or of the same type may be present. The output device 437 displays the window 100 shown in the examples of FIGS. 1A, 1B, 1C, 1D, and 1E.

The input device 438 may be a keyboard, mouse or other pointing device, trackball, touchpad, touchscreen, keypad, microphone, voice recognition device, or any other appropriate mechanism for the user to input data to the computer 410 and manipulate, edit, and move or drag objects displayed on the output device 437. Although only one input device 438 is shown, in another embodiment any number and type of input devices may be present.

The bus 480 may represent one or more busses, e.g., PCI, ISA (Industry Standard Architecture), X-Bus, EISA (Extended Industry Standard Architecture), Universal Serial Bus, Firewire (I.E.E.E. standard 1394), or any other appropriate bus and/or bridge (also called a bus controller).

The computer 410 may be implemented using any suitable hardware and/or software, such as a personal computer or other electronic computing device. Portable computers, laptop or notebook computers, PDAs (Personal Digital Assistants), two-way alphanumeric pagers, keypads, portable telephones, pocket computers, appliances with computational units, and mainframe computers are examples of other possible configurations of the computer 410. The hardware and software depicted in FIG. 4 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 491 may be any suitable network and may support any appropriate protocol suitable for communication to the computer 410. In an embodiment, the network 491 may support wireless communications. In another embodiment, the network 491 supports hard-wired communications, such as a telephone line or cable. In another embodiment, the network 491 supports the Ethernet IEEE (Institute of Electrical and Electronics Engineers) 802.3x specification. In another embodiment, the network 491 is the Internet and supports IP (Internet Protocol). In another embodiment, the network 491 is a local area network (LAN) or a wide area network (WAN). In another embodiment, the network 491 is a hotspot service provider network. In another embodiment, the network 491 is an intranet. In another embodiment, the network 491 is a GPRS (General Packet Radio Service) network. In another embodiment, the network 491 is any appropriate cellular data network or cell-based radio network technology. In another embodiment, the network 491 is an IEEE 802.11 wireless network. In still another embodiment, the network 491 is any suitable network or combination of networks. Although one network 491 is shown, in other embodiments any number of networks (of the same or different types) may be present.

As was described in detail above, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A presentation authoring application with at least one of slide presentation functionality and word processing functionality, the application encoded in one or more machine-readable storage media and comprising:
   a first sequence of instructions executable to modify visibility of alignment guides to indicate overlap of alignment guides of a selected object and of one or more unselected objects; and
   a second sequence of instructions executable to update visibility of the alignment guides responsive to movement of the selected object to reflect changes in overlap of the alignment guides,
   wherein the second sequence of instructions include being executable to perform at least one action selected from the group consisting of: revealing the overlapping guides, increasing visibility of the overlapping alignment guides, changing color of the overlapping guides, and changing texture of the overlapping alignment guides.

2. The presentation authoring application of claim 1, wherein first sequence of instructions executable to modify visibility of alignment guides to indicate overlap of alignment guides of a selected object and of one or more unselected objects, are operable to indicate linear overlap of the alignment guides.

3. A presentation authoring application with at least one of slide presentation functionality and word processing functionality, the application encoded in one or more machine-readable storage media and comprising:
   a first sequence of instructions executable to modify visibility of alignment guides to indicate overlap of alignment guides of a selected object and of one or more unselected objects and executable to update visibility of the alignment guides responsive to movement of the selected object to reflect changes in overlap of the alignment guides; and
   a second sequence of instructions executable to modify one or more display characteristics of the selected object and the one or more unselected objects to indicate the overlap, and executable to update the display characteristics responsive to movement of the selected object to reflect changes in alignment of the selected object and the one or more unselected objects; and
   wherein the second sequence of instructions include being executable to perform at least one action selected from the group consisting of: increasing visibility, changing color, changing line characteristics, and changing texture.

4. The presentation authoring application of claim 3, wherein first sequence of instructions executable to modify visibility of alignment guides to indicate overlap of alignment guides of a selected object and of one or more unselected objects, are operable to indicate linear overlap of the alignment guides.

* * * * *